United States Patent
Li

(10) Patent No.: US 10,071,627 B2
(45) Date of Patent: Sep. 11, 2018

(54) INTEGRATED STEERING DRIVE AXLE FOR VEHICLE AND ELECTRIC VEHICLE

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 0 days.

(21) Appl. No.: 15/307,547

(22) PCT Filed: Mar. 5, 2015

(86) PCT No.: PCT/CN2015/073714
§ 371 (c)(1),
(2) Date: Oct. 28, 2016

(87) PCT Pub. No.: WO2015/165302
PCT Pub. Date: Nov. 5, 2015

(65) Prior Publication Data
US 2017/0050514 A1    Feb. 23, 2017

(30) Foreign Application Priority Data

Apr. 29, 2014    (CN) .......................... 2014 1 0179348

(51) Int. Cl.
*B60K 1/02* (2006.01)
*B60K 7/00* (2006.01)
(Continued)

(52) U.S. Cl.
CPC ................ *B60K 17/14* (2013.01); *B60K 1/02* (2013.01); *B60K 7/0007* (2013.01);
(Continued)

(58) Field of Classification Search
CPC ........ B60K 1/02; B60K 17/04; B60K 17/043; B60K 17/08; B60K 17/14; B60K 17/306
See application file for complete search history.

(56) References Cited

U.S. PATENT DOCUMENTS 4,657,104 A * 4/1987 Holland .................. B25J 5/007
180/211
4,741,409 A * 5/1988 Westercamp .......... B62D 5/001
180/402
(Continued)

FOREIGN PATENT DOCUMENTS

CN    1167709 A    12/1997
CN    201227957 Y    4/2009
(Continued)

OTHER PUBLICATIONS

International Search Report and Written Opinion for International Patent Application No. PCT/CN2015/073714, dated May 29, 2015, with English translation of Search Report, 10 pages.
(Continued)

*Primary Examiner* — Joseph M Rocca
*Assistant Examiner* — Maurice L Williams
(74) *Attorney, Agent, or Firm* — Alston & Bird LLP

(57) ABSTRACT

The present invention provides an integrated steering drive axle for a vehicle and an electric vehicle. The integrated steering drive axle includes an integrally rigid axle beam arranged to extend between the two wheels along the lateral direction of the vehicle, and two motor drive systems mounted at the axle beam, wherein each motor drive system can independently drive a corresponding one of the two
(Continued)

wheels to rotate and turn; wherein each motor drive system includes: a first drive electric motor, arranged separately from the corresponding wheel; a first transmission mechanism, arranged between the first drive electric motor and the corresponding wheel and used for transferring the output power of the first drive electric motor to the corresponding wheel to drive the corresponding wheel to rotate; and a second drive electric motor, used for providing steering power necessary for steering the corresponding wheel. According to the present invention, the two motor drive systems for independently driving the wheels at opposite sides are mounted at the integrated steering drive axle, thereby improving the control flexibility of the vehicle and achieving independent driving and independent steering of the wheels.

10 Claims, 2 Drawing Sheets

(51) Int. Cl.
  B60K 17/04 (2006.01)
  B60K 17/08 (2006.01)
  B60K 17/14 (2006.01)
  B60K 17/30 (2006.01)
(52) U.S. Cl.
  CPC ............ *B60K 17/043* (2013.01); *B60K 17/08* (2013.01); *B60K 17/30* (2013.01); *B60K 17/306* (2013.01)

(56) References Cited

U.S. PATENT DOCUMENTS

| | | | |
|---|---|---|---|
| 5,465,806 A | 11/1995 | Higasa et al. | |
| 5,901,805 A * | 5/1999 | Murakami | B62D 1/28 180/168 |
| 5,931,486 A * | 8/1999 | Andreis | B60G 3/20 180/905 |
| 6,138,785 A * | 10/2000 | Satoh | B60B 33/00 180/305 |
| 6,343,671 B1 * | 2/2002 | Ackermann | B62D 1/166 180/443 |
| 6,491,127 B1 * | 12/2002 | Holmberg | B60K 7/0007 180/21 |
| 7,418,328 B2 * | 8/2008 | Romig | A01D 34/008 180/253 |
| 7,520,367 B2 * | 4/2009 | Nakatsu | B62D 5/008 180/402 |
| 8,267,205 B2 * | 9/2012 | Ishii | B60K 17/30 180/252 |
| 8,789,647 B2 * | 7/2014 | Hwang | B62D 5/001 180/444 |
| 8,857,554 B1 * | 10/2014 | Keller | B60K 17/30 180/253 |
| 9,073,423 B2 * | 7/2015 | Swasey | B60K 17/30 |
| 9,079,604 B2 * | 7/2015 | Di Giusto | B62D 7/09 |
| 9,145,961 B2 | 9/2015 | Suzuki et al. | |
| 9,359,005 B2 * | 6/2016 | Doan | B60K 17/303 |
| 2003/0155163 A1 * | 8/2003 | Sugata | B60K 7/0007 180/199 |
| 2004/0012162 A1 | 1/2004 | Burke | |
| 2005/0087390 A1 * | 4/2005 | Furumi | B62D 5/04 180/446 |
| 2005/0236208 A1 * | 10/2005 | Runkles | A61G 5/045 180/254 |
| 2005/0257992 A1 * | 11/2005 | Shiino | B62D 5/04 180/444 |
| 2006/0278466 A1 * | 12/2006 | Cheng | B62D 5/04 180/444 |
| 2008/0120974 A1 * | 5/2008 | Dong | B60K 7/0015 60/464 |
| 2009/0000839 A1 * | 1/2009 | Ishii | A01D 34/64 180/65.51 |
| 2009/0101425 A1 * | 4/2009 | Laurent | B60G 3/01 180/65.51 |
| 2010/0108417 A1 * | 5/2010 | Gilmore | B60K 6/448 180/65.51 |
| 2010/0200323 A1 * | 8/2010 | Egawa | B60G 3/20 180/252 |
| 2011/0036658 A1 * | 2/2011 | Cantemir | B60K 6/40 180/246 |
| 2011/0109052 A1 * | 5/2011 | Hatzikakidis | B60G 3/12 280/5.5 |
| 2011/0168474 A1 * | 7/2011 | Checketts | B60K 7/0007 180/237 |
| 2011/0259657 A1 * | 10/2011 | Fuechtner | B60K 6/52 180/65.21 |
| 2012/0052995 A1 * | 3/2012 | Scarbo | B60K 7/0007 474/86 |
| 2013/0035203 A1 * | 2/2013 | Arakawa | B60K 7/0007 477/5 |
| 2013/0066521 A1 * | 3/2013 | Watanabe | B62D 15/025 701/41 |
| 2014/0011625 A1 * | 1/2014 | Thompson | B60K 17/043 475/225 |
| 2014/0182954 A1 * | 7/2014 | Weber | B60K 17/16 180/65.7 |
| 2014/0311842 A1 * | 10/2014 | Kambayashi | B60K 1/00 188/371 |
| 2015/0027795 A1 | 1/2015 | Hirai et al. | |
| 2015/0306955 A1 * | 10/2015 | Knoblauch | B60K 1/02 180/242 |
| 2015/0367720 A1 * | 12/2015 | Yukishima | B60K 7/0007 180/60 |

FOREIGN PATENT DOCUMENTS

| | | | |
|---|---|---|---|
| CN | 101890908 A | 11/2010 | |
| CN | 102470747 A | 5/2012 | |
| CN | 102774269 A | 11/2012 | |
| CN | 103552459 A | 2/2014 | |
| CN | 103963637 A | 8/2014 | |
| DE | 29518401 U1 | 3/1997 | |
| DE | 10 2009 002440 | 10/2010 | |
| EP | 0013190 A1 | 7/1980 | |
| EP | 0647554 A2 * | 4/1995 | ............ B60G 5/00 |
| JP | S62218225 | 9/1987 | |
| JP | 2005-205976 A | 8/2005 | |
| JP | 2006306333 | 11/2006 | |
| JP | 2007-001564 A | 1/2007 | |
| JP | 2013112112 | 6/2013 | |
| JP | 2013169946 | 9/2013 | |
| JP | 2014061744 | 4/2014 | |
| WO | WO 98/19875 | 5/1998 | |
| WO | WO 2012042983 | 4/2012 | |

OTHER PUBLICATIONS

Extended European Search Report for corresponding European Application No. 15786439.8 dated Mar. 30, 2017, 5 pages.

* cited by examiner

INTEGRATED STEERING DRIVE AXLE FOR VEHICLE AND ELECTRIC VEHICLE

FIELD OF THE INVENTION

The present invention relates to the industry of electric vehicles, and in particular, to an integrated steering drive axle and an electric vehicle.

BACKGROUND OF THE INVENTION

An existing electric vehicle typically has two drive axles, and each drive axle is used for driving a pair of wheels located at opposite sides of the vehicle. Each drive axle receives a driving force provided by a drive electric motor arranged at the front or the rear of the vehicle. According to the number and the positions of the drive axles driven by the drive electric motor, the electric vehicle may achieve front-wheel drive, rear-wheel drive or four-wheel drive.

For a vehicle with a larger carrying capacity, for example, a large or heavy passenger bus or truck, its chassis is generally provided with more drive axles, for example, four axles, six axles or eight axles. The driving structure of such a vehicle is complex, and thus corresponding eight-wheel drive, twelve-wheel drive or sixteen-wheel drive are more difficult to achieve. Due to the limitation of the electric energy storage technology of the existing electric vehicle, when considering the necessary power demands and the endurance mileage, such a vehicle typically employs a fuel engine as a direct power source, instead of being driven by a drive electric motor as in the electric vehicle.

Chinese patent application No. 201310467918.2 of the applicant provides a power system for a series hybrid electric vehicle. The power system allows the use of alternative fuels with lower energy density instead of using traditional gasoline or diesel, and allows an engine in an auxiliary power unit to work in a working condition area in which both oil consumption and emission are very low, thereby effectively reducing the emission, improving the economic efficiency of the fuels, and compensating for the problem that the energy conversion efficiency of the power system of the series hybrid electric vehicle is relatively low. Moreover, the power system can be flexibly provided with an appropriate number of engines for combined use according to demands. Thus, through the combined use of a sufficient number of engines, electric power sufficient to meet the demands of the vehicle with a larger carrying capacity, for example a truck, can be provided by using cheap fuels, thereby providing possibility for an electric driving mode of such a vehicle.

For the existing electric vehicle employing the drive electric motor, wheels on opposite sides of one axle are generally driven by one drive electric motor, which is not conducive to the flexibility of the controlling of the electric vehicle. Another solution for the existing electric vehicle is to employ an in-wheel motor, but the cost is high, and because of the limitation on the provided power, it is merely applied to vehicles with a small carrying capacity, such as family cars.

SUMMARY OF THE INVENTION

One object of the present invention is to provide an integrated steering drive axle for a vehicle, which is particularly suitable for vehicles with a large carrying capacity, for example, large or heavy passenger buses or trucks. Another object of the present invention is to provide a modular mounting assembly integrating electric motors for rotating and turning with the axle. A further object of the present invention is to provide an electric vehicle provided with the aforementioned integrated steering drive axle.

According to one aspect of the present invention, an integrated steering drive axle for a vehicle is provided, used for mounting two wheels respectively at corresponding opposite sides thereof and driving the wheels to rotate and turn, and including: an integrally rigid axle beam, which can be arranged to extend between the two wheels along a lateral direction of the vehicle; two motor drive systems mounted at the axle beam, wherein each motor drive system can independently drive a corresponding one of the two wheels to rotate and turn. Each motor drive system includes: a first drive electric motor, arranged separately from the corresponding wheel; a first transmission mechanism, arranged between the first drive electric motor and the corresponding wheel and used for transferring the output power of the first drive electric motor to the corresponding wheel to drive the corresponding wheel to rotate; and a second drive electric motor, used for providing steering power necessary for turning or steering the corresponding wheel.

Further, the first transmission mechanism includes a speed reducer, used for transferring the output power of the first drive electric motor and outputting a reduced rotating speed compared with the rotating speed of a rotating shaft of the first drive electric motor.

Further, the first drive electric motor is arranged so that a rotation axis of the rotating shaft thereof extends along the lateral direction of the vehicle.

Further, the first transmission mechanism of the vehicle further includes a half-shaft, used for transferring the output power of the first drive electric motor to the corresponding wheel, wherein the whole or a part of the half-shaft is configured to be capable of swing with the turning of the wheel.

Further, the half-shaft includes a first part and a second part, which are in transmission connection by a universal joint, wherein the first part is configured to be capable of swing with the turning of the wheel, and the second part is formed by the rotating shaft of the first drive electric motor.

Further, each motor drive system further includes a second transmission mechanism mounted at the axle beam, and the second transmission mechanism is arranged between the second drive electric motor and the corresponding wheel and is used for transferring the output power of the second drive electric motor to the corresponding wheel to drive the corresponding wheel to turn.

Further, the axle beam is formed into a form of a hollow axle housing, the first drive electric motor is arranged in the hollow axle housing;

optionally, the second drive electric motor is also arranged in the hollow axle housing; and further optionally, at least a part of the first transmission mechanism is also arranged in the hollow axle housing.

According to another aspect of the present invention, an electric vehicle is further provided, including a plurality of axles, wherein at least one of the plurality of axles is the foregoing integrated steering drive axle.

Further, each one of the plurality of axles adopts the integrated steering drive axle.

Further, the plurality of axles include at least 3 axles, and optionally, the plurality of axles include at least 4 axles.

According to the present invention, two motor drive systems respectively for independently driving the corresponding wheels at opposite sides are mounted on the integrated steering drive axle and are respectively used for controlling the turning and the rotating of the corresponding wheel, thereby improving the control flexibility of the vehicle and achieving independent driving and independent turning or steering of the wheels. The integrated steering drive axle of the present invention is particularly suitable for use in vehicles with a large carrying capacity, for example, large or heavy passenger buses or trucks. In some embodiments of the present invention, the integrated steering drive axle is further particularly suitable as a motor drive axle transformed from an existing axle with fuel engine power.

Further, the motor drive systems for driving the corresponding wheels constitute a modular structure together with the axle by a preassembly manner, so as to facilitate and simplify the mounting of the axles of the vehicle.

According to the following detailed description of specific embodiments of the present invention in conjunction with the drawings, those skilled in the art will better understand the aforementioned and other objects, advantages and features of the present invention.

BRIEF DESCRIPTION OF THE DRAWINGS

Some specific embodiments of the present invention will be described below in detail in an exemplary, rather than a restrictive manner with reference to the drawings. Identical reference signs in the drawings represent identical or similar components or parts. Those skilled in the art should understand that these drawings are not necessarily drawn to scale. In the drawings.

DETAILED DESCRIPTION OF THE EMBODIMENTS

Figure 1:
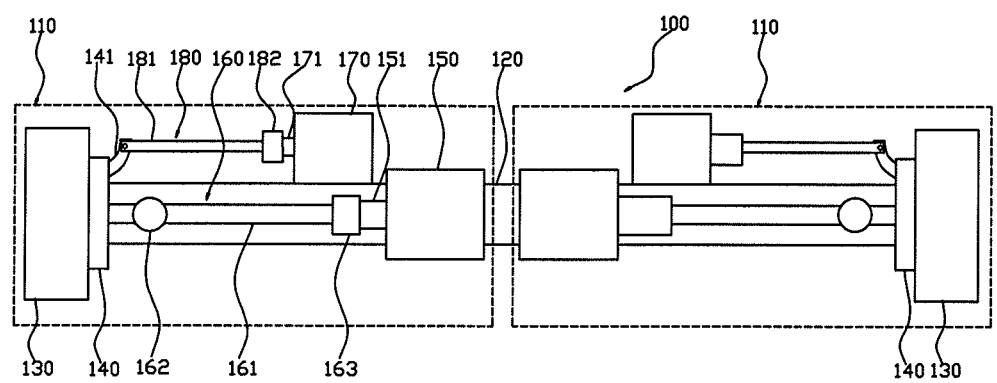
FIG. 1 is a schematic structural diagram of an integrated steering drive axle according to one embodiment of the present invention.

FIGS. 1 to 5 respectively show schematic structural diagrams of a plurality of embodiments of an integrated steering drive axle 100 according to the present invention. In the present invention, the integrated steering drive axle 100 is generally used for mounting two wheels 130 respectively at corresponding opposite sides thereof and driving the wheels 130 to rotate and turn. It should be noted that the wheels 130 shown in the drawings are only hub parts thereof. The integrated steering drive axle 100 may include an integrally rigid axle beam 120, and the axle beam 120 may be arranged to extend between the two wheels 130 along the lateral direction of the vehicle. Two motor drive systems 110 may be mounted at the axle beam 120, and each motor drive system 110 may independently drive one corresponding wheel 130 of the two wheels 130 to rotate and turn. Each motor drive system 110 is arranged adjacent to the corresponding wheel 130 and may include a first drive electric motor 150, a first transmission mechanism 160 and a second drive electric motor 170. The first drive electric motor 150 is arranged separately from the corresponding wheel 130, that is to say, no part of the first drive electric motor 150 belongs to the wheel 130, which is apparently different from the in-wheel motor in the prior art, and thus the first drive electric motor 150 may the form of a conventional motor. The first transmission mechanism 160 may be arranged between the first drive electric motor 150 and the corresponding wheel 130 and is used for transferring the output power of the first drive electric motor 150 to the corresponding wheel 130 to drive the corresponding wheel 130 to rotate, so as to cause the vehicle to move forward or backward. The second drive electric motor 170 may be used for providing steering power necessary for turning or steering the corresponding wheel 130, so as to drive the corresponding wheel 130 to deflect from the travelling direction of the vehicle. According to the integrated steering drive axle 100, the two motor drive systems 110 are integrated with a single axle to respectively steer and rotate the two corresponding wheels 130. The two motor drive systems 110 can work independently from each other to achieve independent control of the two corresponding wheels 130, so as to allow individually independent rotating and steering of the two wheels 130.

The first transmission mechanism 160 may further include a speed reducer 163 for transferring the output power of the first drive electric motor 150. The speed reducer 163 can achieve a reduced rotating speed compared with the rotating speed of a rotating shaft 151 of the first drive electric motor 150, so as to increase the torque while reducing the rotating speed.

Figure 4:
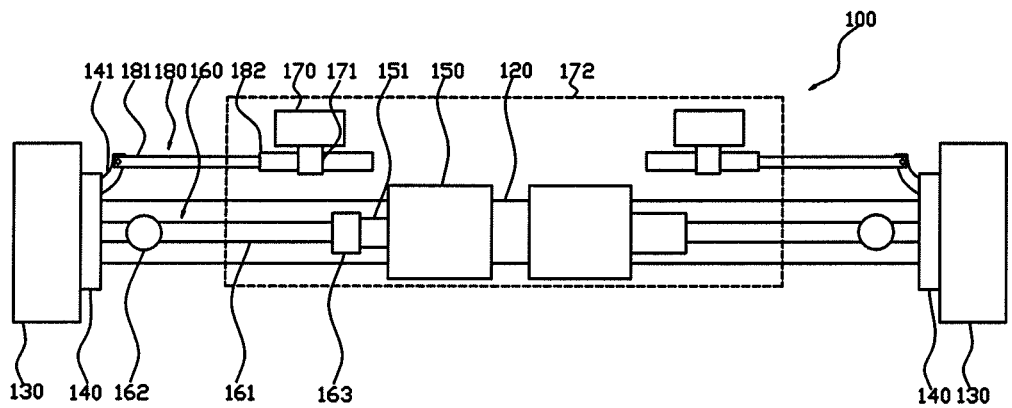
FIG. 4 is a schematic structural diagram of an integrated steering drive axle according to one embodiment of the present invention, wherein a motor drive system is mounted at a rigid solid axle beam.
Figure 5:
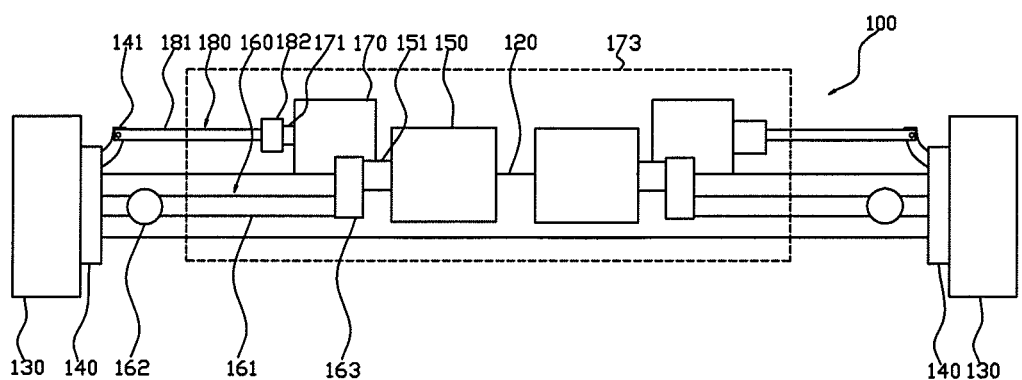
FIG. 5 is a schematic structural diagram in one embodiment of the present invention, in which the torque direction of a rotating shaft of the first drive electric motor is consistent with the rotating direction of a corresponding wheel.

In the embodiments as shown in FIGS. 1, 4 and 5, the first drive electric motor 150 is arranged so that the rotation axis of the rotating shaft 151 thereof extends along the lateral direction of the vehicle, that is, basically parallel to the axle beam 120. In this structure, the torque output direction of the rotating shaft 151 of the first drive electric motor 150 is the same as the torque direction required for driving the corresponding wheel 130 to rotate, so that the power thereof can be transferred to the corresponding wheel 130 by the speed reducer 163 without changing the torque direction of the rotating shaft 151 of the first drive electric motor 150. In this way, the speed reducer 163 only plays the function of reducing the rotating speed, and this can be simply achieved by a reduction gear set composed of a plurality of parallel gears. The first drive electric motor 150 arranged in such manner is beneficial to decreasing the overall lateral size of the integrated steering drive axle 100. In the embodiments as shown in FIGS. 1 and 4, the rotating shaft 151 of the first drive electric motor 150 is arranged coaxially with a half-shaft 161 that will be described below, and in the embodiment as shown in FIG. 5, the rotating shaft 151 of the first drive electric motor 150 is arranged to be parallel to, but offset from the half-shaft 161, and the speed reducer 163 therebetween is used for transferring of the torque.

Figure 2:
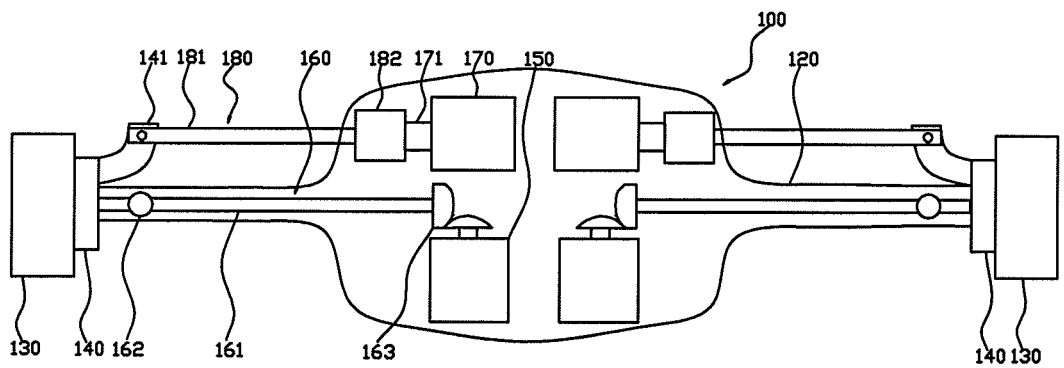
FIG. 2 is a schematic structural diagram of an integrated steering drive axle according to one embodiment of the present invention, wherein the axle beam is a hollow housing.
Figure 3:
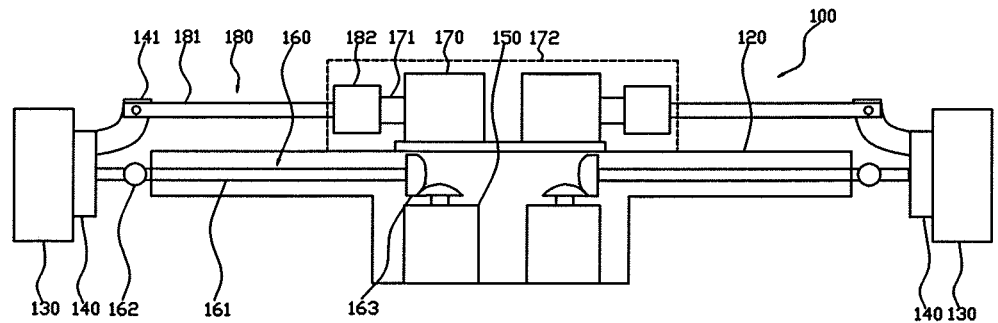
FIG. 3 is a schematic structural diagram of an integrated steering drive axle according to one embodiment of the present invention, wherein only the first drive electric motor and the first transmission system are mounted within the axle beam as a hollow axle housing.

In the embodiments as shown in FIGS. 2 and 3, the first drive electric motor 150 is arranged so that the rotation axis of the rotating shaft 151 thereof extends along the longitudinal direction of the vehicle, and this is similar to the arrangement of a conventional longitudinal transmission shaft in an existing vehicle power train. At this time, the speed reducer 163 may adopt a structure similar to that of the existing speed reducer, for example, is achieved by conical gear pairs, which are arranged to be vertical to each other. In this way, the speed reducer 163 may directly transfer the torque of the rotating shaft 151 of the first drive electric motor 150, as well changing the direction of the torque. The first drive electric motor 150 arranged in such manner is more beneficial to the transformation of the existing axles.

The first transmission mechanism 160 may further include the half-shaft 161 for transferring the output power of the first drive electric motor 150 to the corresponding wheel 130. The half-shaft 161 may have a structure that is basically similar to that of the half-shaft of the existing vehicle, but obviously, in the present invention, as each half-shaft 161 is directly driven by one first drive electric motor 150 arranged in the vicinity, instead of two opposite half-shafts being driven by one transmission shaft as in the prior art. Therefore, in the case that the first drive electric motor 150 is arranged to be closer to the corresponding wheel 130, the length of the half-shaft 161 can be shorter than that of the existing conventional half-shaft. To allow turning or steering of the wheel 130, the whole or a part of the half-shaft 161 is configured to be capable of swing with the turning or steering of the corresponding wheel 130. The half-shaft 161 may include a first part and a second part, which are in transmission connection via a universal joint 162 (usually a constant velocity universal joint), and in FIGS. 1 to 5, the first part and the second part are respectively a left segment and a right segment of the half-shaft 161, which are separated by the universal joint 162. The first part of the half-shaft 161 is configured to be capable of swing with the steering of the corresponding wheel 130, and the second part of the half-shaft 161 may be held to be only rotatable. For a specific half-shaft structure, reference may be made to the half-shaft structure of the steering drive axle with fuel power in the prior art.

As mentioned above, in the embodiments as shown in FIGS. 1 and 4, the rotating shaft 151 of the first drive electric motor 150 is arranged coaxially with the half-shaft 161 that will be described below, and in this case, although not shown in the figures, it is conceivable that the rotating shaft 151 of the first drive electric motor 150 may extend farther towards the universal joint 162, and the rotating shaft 151 of the first drive electric motor 150 may even be directly formed as or used as the second part of the half-shaft 161. In this case, the half-shaft 161 may be deemed as being formed only by the part at the left of the universal joint 162, so the entire half-shaft 161 is configured to be capable of swing with the steering of the corresponding wheel 130.

In FIGS. 1 to 5, the motor drive system 110 may further include a second transmission mechanism 180 mounted at the axle beam 120. The second transmission mechanism 180 is arranged between the second drive electric motor 170 and the corresponding wheel 130 and is used for transferring the output power of the second drive electric motor 170 to the corresponding wheel 130, so as to drive a steering knuckle 140 of the corresponding wheel 130 to propel the corresponding wheel 130 to turn. The second transmission mechanism 180 may include a steering gear 182 and a steering lever 181. The steering gear 182 may convert the rotation of a rotating shaft 171 of the second drive electric motor 170 into linear motion of the steering lever 181, so as to pull a pull rod arm 141 of the steering knuckle 140 at the corresponding wheel 130, to achieve turning or steering of the corresponding wheel 130. In FIGS. 1 to 3 and FIG. 5, the rotating shaft 171 of the second drive electric motor 170 extends along a direction that is basically parallel to the axle beam 120 or the steering lever 181. In FIG. 4, the rotating shaft 171 of the second drive electric motor 170 extends along a direction that is vertical to the axle beam 120 or the steering lever 181. A specific structure of the steering gear 182 may adopt a suitable steering gear structure in the prior art according to the arrangement direction of the second drive electric motor 170. Particularly in the case of FIG. 4, the steering gear 182 may conveniently adopt a structure of rack-and-pinion steering gear in the prior art. When the output rotating speed of the second drive electric motor 170 needs to be reduced, the steering gear 182 may be additionally further provided with a reduction mechanism, such as a reduction gear set.

As shown in FIGS. 2 and 3, the axle beam 120 can be formed as a hollow axle housing for arranging several components of the integrated steering drive axle 100 therein. In the embodiment as shown in FIG. 2, both of the two motor drive systems 110 are mounted in the axle beam 120 provided with the hollow axle housing. The first drive electric motor 150, the first transmission mechanism 160, the second drive electric motor 170 and the second transmission mechanism 180 may be pre-assembled before being mounted in the axle beam 120. In the embodiment as shown in FIG. 3, the first drive electric motor 150 and the first transmission mechanism 160 are mounted in the hollow axle housing as the axle beam. Other components not mounted in the axle beam 120, for example, the second drive electric motor 170, the steering gear 182 and the like, may be mounted on a mounting frame 172 (schematically represented by dotted lines in the figure) that is fixed at the outside of the axle beam 120, and are held by the mounting frame 172. The mounting frame 172 may also be formed into a basically enclosed housing shape. By means of the aforementioned installation, the entire steering drive axle 100 is more suitable for being formed into a preassembled modular component. In use, the integrated steering drive axle 100 may be mounted to the vehicle as a whole. Although some shapes of the axle beam 120 in the form of the hollow axle housing are shown in FIGS. 2 and 3, they are merely exemplary, in practice, the specific shape of the hollow axle housing may be designed according to the arrangement positions and the shapes of the components therein, for example, the surface of the axle housing is designed to fit to the overall outlines of all components therein to form a compact axle housing.

In the embodiment as shown in FIGS. 1, 4 and 5, the two motor drive systems 110 may be fixedly mounted at the outside of the solid axle beam 120. A shown in FIGS. 4 and 5, the components may be conveniently mounted to and held by the mounting frame 172 (schematically represented by dotted lines in the figures) that is fixed at the outside of the axle beam 120. Certainly, the mounting frame 172 may also be formed into a basically enclosed housing shape, in order to enclose the two motor drive systems 110.

In another aspect, the present invention further provides an electric vehicle including a plurality of axles, wherein at least one of the plurality of axles is the foregoing integrated steering drive axle 100. Further, each one of all axles in the electric vehicle may adopt the integrated steering drive axle 100. The integrated steering drive axle 100 of the present invention is particularly suitable for use in vehicles with a large carrying capacity, for example, large or heavy passenger buses or trucks. In this case, the electric vehicle may have more axles, for example, at least 3 and even at least 4 axles, and each axle may adopt the integrated steering drive axle 100 according to the present invention. In some cases, three axles respectively at the front, middle and rear of the electric vehicle may adopt the integrated steering drive axles 100, and the axle between every two adjacent integrated steering drive axles may adopt other axle structures in the existing vehicle, for example, an axle for mounting follower wheels. The integrated steering drive axle 100 in the present invention may be conveniently obtained by transforming the existing integrated steering drive axle driven by a fuel engine. Specific wheel rotating and steering structures may directly adopt the structures in the existing vehicle, and the transmission shaft and the steering motor in the existing vehicle are replaced by the corresponding first drive electric motor 150 and the second drive electric motor 170. In addition, after the corresponding wheel is independently controlled by the first drive electric motor 150 and the second drive electric motor 170, differentials used in the axles in the existing vehicle can be omitted.

So far, those skilled in the art should be aware that, although a plurality of exemplary embodiments of the present invention have been shown and described herein in detail, a lot of other variations or modifications conforming to the principle of the present invention can still be directly determined or derived according to the contents disclosed in the present invention without departing from the spirit and scope of the present invention. Therefore, the scope of the present invention should be understood and deemed as covering all of these other variations or modifications.

The invention claimed is:

1. An integrated steering drive axle for a vehicle, used for mounting two wheels respectively at corresponding opposite sides thereof and driving the wheels to rotate and turn, comprising:
   an integrally rigid axle beam, which can be arranged to extend between the two wheels along a lateral direction of the vehicle; and
   two motor drive systems mounted at the axle beam, each of which can independently drive a corresponding one of the two wheels to rotate and turn, wherein each motor drive system comprises:
      a first drive electric motor, arranged separately from the corresponding wheel;
      a first transmission mechanism, arranged between the first drive electric motor and the corresponding wheel and used for transferring the output power of the first drive electric motor to the corresponding wheel to drive the corresponding wheel to rotate; and
      a second drive electric motor, used for providing steering power necessary for turning the corresponding wheel;
   wherein the axle beam is formed into a form of a hollow axle housing, the first drive electric motor is arranged in the hollow axle housing, and the first drive electric motor is arranged such that a rotation axis of a rotating shaft thereof extends along a longitudinal direction of the vehicle; and
   a rotating shaft of the second drive electric motor extends along a direction parallel to the axle beam, and the second drive electric motor is mounted on and held by a mounting frame fixed outside of the axle beam such that the integrated steering drive axle is formed into a preassembled modular component.

2. The integrated steering drive axle of claim 1, wherein the first transmission mechanism comprises a speed reducer, used for transferring the output power of the first drive electric motor and outputting a reduced rotating speed compared with the rotating speed of a rotating shaft of the first drive electric motor.

3. The integrated steering drive axle of claim 1, wherein the first transmission mechanism further comprises a half-shaft, used for transferring the output power of the first drive electric motor to the corresponding wheel;
   wherein the whole or a part of the half-shaft is configured to be capable of swing with the turning of the wheel.

4. The integrated steering drive axle of claim 3, wherein the half-shaft comprises a first part and a second part, which are in transmission connection by a universal joint, wherein the first part is configured to be capable of swing with the turning of the wheel, and the second part is driven by the rotating shaft of the first drive electric motor.

5. The integrated steering drive axle of claim 1, wherein each motor drive system further comprises a second transmission mechanism mounted at the axle beam, and the second transmission mechanism is arranged between the second drive electric motor and the corresponding wheel and is used for transferring the output power of the second drive electric motor to the corresponding wheel to drive the corresponding wheel to turn.

6. An electric vehicle, comprising a plurality of axles, wherein at least one of the plurality of axles is the integrated steering drive axle of claim 1.

7. The electric vehicle of claim 6, wherein each one of the plurality of axles adopts the integrated steering drive axle.

8. The electric vehicle of claim 6, wherein the plurality of axles comprise at least 3 axles.

9. The electric vehicle of claim 8, wherein the plurality of axles comprise at least 4 axles.

10. The integrated steering axle of claim 1, wherein at least a part of the first transmission mechanism is also arranged in the hollow axle housing.

* * * * *